United States Patent [19]

Ibbott

[11] Patent Number: 4,614,695
[45] Date of Patent: Sep. 30, 1986

[54] BATTERY AND METHOD OF PRODUCING SAME

[75] Inventor: Jack K. Ibbott, Tokyo, Japan

[73] Assignee: Fanuc Ltd., Tokyo, Japan

[21] Appl. No.: 675,060

[22] PCT Filed: Mar. 14, 1984

[86] PCT No.: PCT/JP84/00100
§ 371 Date: Nov. 7, 1984
§ 102(e) Date: Nov. 7, 1984

[87] PCT Pub. No.: WO84/03801
PCT Pub. Date: Sep. 27, 1984

[30] Foreign Application Priority Data

Mar. 14, 1983 [JP] Japan .................. 58-40624

[51] Int. Cl.$^4$ .................. H01M 6/06; H01M 2/00
[52] U.S. Cl. .................. 429/127; 429/162; 29/623.4
[58] Field of Search .................. 429/162, 94, 127, 68, 429/229; 29/623.4

[56] References Cited

U.S. PATENT DOCUMENTS

| 282,784 | 8/1883 | Schlosser | 429/68 |
| 2,666,802 | 1/1954 | Wodring et al. | 429/162 |
| 2,762,858 | 9/1956 | Wood | 429/162 |
| 3,314,820 | 4/1967 | Smith | 29/623.4 |
| 3,485,677 | 12/1969 | Balaguer | 429/94 |
| 3,617,387 | 11/1971 | Grulke et al. | 429/162 |

FOREIGN PATENT DOCUMENTS 48-05806 2/1973 Japan .................. 429/127

Primary Examiner—Donald L. Walton
Attorney, Agent, or Firm—Wenderoth, Lind & Ponack

[57] ABSTRACT

A battery includes ion-permeable sheeting densely filled with carbon fiber or fine carbon particles, and aluminum, zinc, or other metal foil or fine powder, such two members being bonded together with an electrolyte interposed therebetween.

23 Claims, 4 Drawing Figures

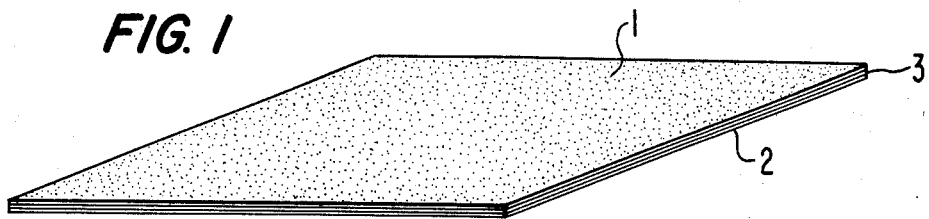
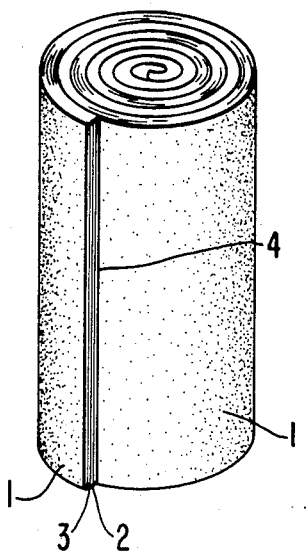
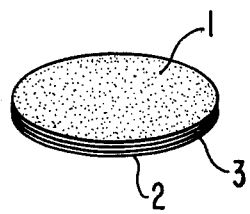
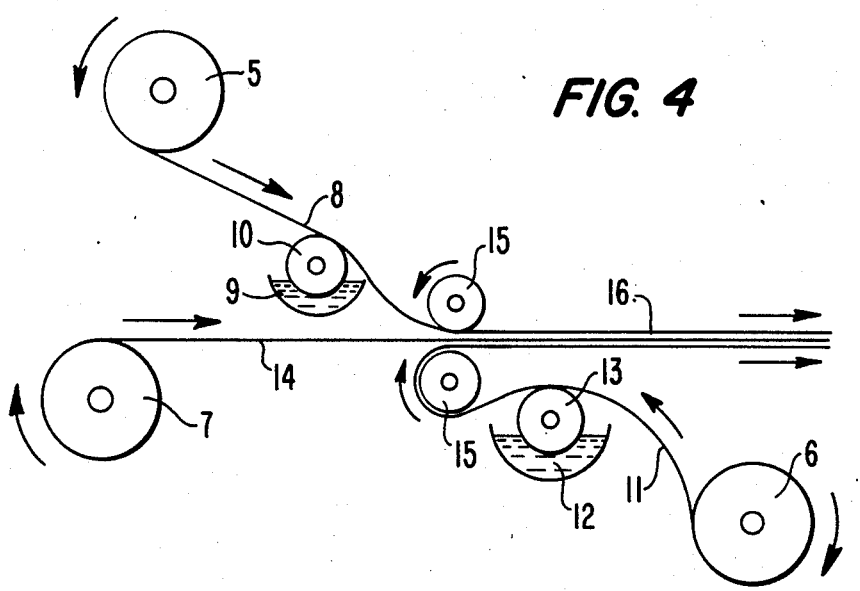

BATTERY AND METHOD OF PRODUCING SAME

BACKGROUND OF THE INVENTION

The present invention relates to a battery and a method for producing the same, said battery having a positive pole made of carbon and a negative pole made of metal such as zinc and aluminum. In the conventional battery of this kind, the positive pole is a carbon rod or carbon plate and a mix impregnated with an electrolyte such as ammonium chloride is hermetically sealed in a zinc can or plate. Such a battery can be produced at a low cost and is extremely economical, but its application is limited due to its comparatively large volume.

The battery of this invention is entirely different from the conventional ones, although it is similar in that the positive pole is made of carbon and the negative pole is made of zinc or aluminum. It is very thin and can be cut or formed into any shape, e.g., cylinder, that fits a variety of applications. It is an object of this invention to provide such a battery and a method for producing the same in an extremely easy way.

SUMMARY OF THE INVENTION

The battery of this invention is made up of a positive pole made of sheeting densely filled with carbon fiber or fine carbon particles, a negative pole made of aluminum, zinc, or other metal foil, or fine metal powder in the form of a layer, and an electrolyte in the form of sheet interposed between the positive pole and negative pole.

The sheeting that forms the positive pole is fibrous paper densely filled with conductive carbon particles (e.g., black carbon paper), or fabric formed by interlacing carbon fiber. The positive pole can also be formed by applying a liquid containing a large quantity of carbon particles to one side of an ion-permeable sheet material. The negative pole is usually made of aluminum or zinc or other metal foil for economical reasons, but it can also be made of fine metal powder.

An electrolyte is interposed between the positive pole and negative pole. The electrolyte is selected from a variety of easy-to-ionize substances. A preferred example is a semisolid paste that bonds the sheeting and the metal foil together. For economical reasons, the paste may be a starch paste such as used for bonding paper in deskwork. If necessary, porous thin paper impregnated with the adherent electrolyte may be interposed between the sheeting that forms the positive pole and the metal foil that forms the negative pole. The thin paper serves as a separator that prevents the carbon fiber or carbon particles on the sheeting from coming into direct contact with the metal foil. In the case where the positive pole is formed by applying carbon particles to one side of ion-permeable paper or sheeting, the metal foil forming the negative pole can be bonded directly to the other side of the paper or sheeting with the electrolytic paste, because the paper or sheeting itself functions as a separator.

According to the method of this invention, the battery of this invention is produced by integrally bonding a metal foil (e.g., aluminum or zinc foil) to either side of a sheet material densely filled with carbon fiber or fine carbon particles, by means of a solid or semisolid electrolyte. The sheet material and metal foil are fed continuously. The resulting product is cut into desired dimensions and configuration. The extremely thin battery thus produced generates a constant voltage. The current (or capacity) of the battery is proportional to the area of the battery. In order to obtain a comparatively high capacity, the battery may be rolled into a cylindrical form.

These and other objects and advantages of the invention may be readily ascertained by referring to the following description and appended drawings in which:

BRIEF DESCRIPTION OF THE DRAWINGS

FIG. 1 is a perspective view of a battery in the form of a comparatively wide sheet according to the invention, with the thickness shown enlarged.

FIG. 2 is a perspective view of a circular battery cut out of the sheet battery as shown in FIG. 1.

FIG. 3 is a perspective view of a cylindrical battery made by rolling the sheet battery as shown in FIG. 1.

FIG. 4 is a schematic drawing illustrating a method for producing the battery of this invention.

DETAILED DESCRIPTION OF THE INVENTION

Embodiments of the thin sheet battery of this invention are shown in FIGS. 1 and 2. The battery is made up of a positive pole made of fibrous paper 1 filled with fine conductive carbon particles, a negative pole made of metal foil 2 such as aluminum and zinc, and porous thin paper 3, as a separator, impregnated with an electrolyte, said porous thin paper being interposed between the positive and negative poles. The three members are integrally bonded together. The fibrous paper 1 for the positive pole may be commercial paper filled with fine carbon powder to impart a black color. The electrolyte may be a starch paste such as used for deskwork. It can bond the fibrous paper 1 and the metal foil 2 together. The separator 3 may be omitted in the case where the electrolyte layer prevents the carbon particles in the fibrous paper 1 from coming into direct contact with the metal foil 2, or where the positive pole is formed by densely applying carbon particles to one side of the paper and the paper itself functions as a separator.

The output voltage of the battery can be varied by changing the type of the metal foil 2, the type of the electrolyte, and the quantity of carbon particles in the fibrous paper 1. For example, a battery made up of commercial black carbon paper (as the positive pole), aluminum foil for home use (as the negative pole), and starch paste for deskwork (as the electrolyte) has an output voltage of about 0.9 volts. The battery of this invention can be made very thin. The overall thickness could be as thin as 0.1 mm, if the fibrous paper 1 containing carbon particles is 0.05 mm thick, the metal foil 2 is 0.015 mm thick, and the adherent electrolyte layer is 0.035 mm thick.

The extremely thin battery of this invention can be cut into any desired shape, e.g., a circular form, as shown in FIG. 2. The circular battery has the same output voltage as that of the square battery as shown in FIG. 1. Thus, it is possible to cut a large number of batteries having the same output voltage from a comparatively large square battery. In the above-mentioned embodiment, the positive pole is made of fibrous paper densely filled with fine carbon particles; but the fibrous paper may be replaced by sheeting of interlaced carbon fibers or non-woven fabric of short carbon fibers.

Although the battery of this invention is limited in output current, the extremely thin structure makes it suitable for use in an electronic watch and a pocket calculator which needs only a small power. The thin battery will help reduce further the size of these electronic devices. The battery of this invention will be most effectively applied to those recent electronic devices which run with an extremely small current or need voltage alone and need no current. Moreover, being extremely thin and inexpensive, the battery of this invention can be molded into a disposable plastic device.

The thin battery of this invention provides output current which is proportional to the area of the battery. In the case of battery as shown in FIGS. 1 and 2, the output current is small. However, a large current can be obtained if the battery in the form of sheet is rolled, with insulating paper 4 interposed, into a cylindrical form as shown in FIG. 3. In this configuration, one terminal is connected to the center of the roll and the other terminal is connected to the outer portion of the roll. Such a rolled battery resembles a conventional cylindrical battery, but may have a larger output current.

The method for producing the battery of this invention is described in the following with reference to FIG. 4. The battery of this invention can be made in the same way as used for the production of composite paper. At first, a roll 5 of fibrous paper (or any other sheeting) filled with fine carbon particles, a roll 6 of metal foil (aluminum or zinc), and a roll 7 of porous thin fibrous paper are provided and arranged as shown in FIG. 4. As the sheeting 8 is paid off from the roll 5, an electrolytic paste 9 is applied to the underside thereof through a transfer roll 10, and as the metal foil is paid off from the roll 6, an electrolytic paste 12 is applied to the upperside thereof through a transfer roll 13. The sheeting 8 and the metal foil 11 are bonded together by a pair of rolls 15, with the porous fibrous paper 14 interposed between them. Thus there is produced a battery 16 in the form of continuous sheet, in which the sheeting 8 filled with carbon particles functions as the positive pole, and the metal foil 11 functions as the negative pole, the two poles being separated by the electrolyte and porous fibrous paper 14. The thus produced battery 16 is cut to desired size or rolled for storage and transportation. Prior to use, it is cut into desired dimensions and configuration to yield the battery as shown in FIGS. 1 and 2. The square battery may be rolled into a cylindrical form as shown in FIG. 3.

The carbon-filled fibrous paper used in the above-mentioned production method may be replaced by fibrous paper with one side thereof densely coated with carbon particles, or by sheeting of interlaced carbon fibers or non-woven fabric of carbon fibers. In the first case, the porous fibrous paper as a separator is not necessary, and the production process can be simplified to a great extent.

In sum, the battery of this invention is produced by continuously bonding carbon-filled sheeting and metal foil together, with an electrolyte interposed between them, followed by cutting to desired dimensions. The production method is very simple and is performed in the same way as for the production of composite paper. Thus, this invention provides a large quantity of battery continuously and efficiently.

I claim:

1. A composite sheet form battery consisting of only a positive pole, a negative pole, and an electrolyte as the active electric energy producing elements thereof, and wherein:

said positive pole comprises an ion-permeable sheet member having carbon as a positive element;

said negative pole comprises a thin metal member;

said electrolyte comprises a semisolid adhesive bonding said positive pole ion-permeable sheet member and said negative pole thin metal member in composite form;

said positive pole ion-permeable sheet member and said negative pole thin metal member are spaced apart and out of contact with each other; and said battery has a thickness, flexibility, and cutting characteristics similar to paper.

2. A battery as claimed in claim 1, wherein said positive pole comprises said ion-permeable sheet member provided on one surface thereof with a cohesive coating of fine carbon particles, the other surface thereof being provided with said negative pole thin metal member, and with said semisolid adhesive electrolyte therebetween.

3. A battery as claimed in claim 1, wherein said positive pole comprises said ion-permeable sheet member densely containing one of carbon fibers or carbon particles.

4. A battery as claimed in claim 1, wherein said negative pole thin metal member comprises aluminum or zinc foil.

5. A battery as claimed in claim 1, wherein said negative pole thin metal member comprises aluminum or zinc powder.

6. A battery as claimed in claim 1, wherein said ion-permeable sheet member is paper.

7. A battery as claimed in claim 1, wherein said positive pole sheet member and said negative pole thin metal member are spaced apart out of contact with each other by said semisolid adhesive electrolyte therebetween.

8. A battery as claimed in claim 1, wherein said positive pole sheet member and said negative pole thin metal member are spaced apart out of contact with each other by a thin paper separating member bonded therebetween by said semisolid adhesive electrolyte.

9. A method for the continuous production of a wide composite sheet form battery consisting of only a positive pole, a negative pole and an electrolyte as active electric energy producing elements by means of conventional machines employed in paper-making industries, said method comprising:

continuously applying to one surface of a continuous length of an ion-permeable member containing carbon as said positive pole a thin metal member as said negative pole; and bonding said thin metal member to said ion-permeable member by continuously applying therebetween a layer of semisolid adhesive as said electrolyte, thereby forming a continuous length composite sheet form battery having a thickness, flexibility and cutting characteristics similar to paper.

10. A method as claimed in claim 9, further comprising continuously applying a continuous length of thin paper as a separating member between said ion-permeable member and said thin metal member, and continuously applying said semisolid adhesive as said electrolyte between said ion-permeable member and said separating member and between said separating member and said thin metal member.

11. A method as claimed in claim 9, comprising employing a paper laminating machine for performing said applying said thin metal member to said ion-permeable member.

12. A method as claimed in claim 9, wherein said ion-permeable member comprises dense proportions of carbon in the form of carbon fibers or carbon particles.

13. A method as claimed in claim 9, wherein said thin metal member comprises aluminum foil or zinc foil.

14. A method as claimed in claim 9, comprising applying a continuous thin cohesive coating of aluminum powder or zinc powder as said thin metal member.

15. A method as claimed in claim 14, comprising applying said thin cohesive coating by means of a paper coating machine.

16. A method as claimed in claim 9, further comprising cutting said composite sheet form battery into smaller pieces of desired size and shape, by means of a paper cutting mechanism, thereby forming a plurality of smaller batteries.

17. A method for the continuous production of a wide composite sheet form battery consisting of only a positive pole, a negative pole and an electrolyte as active electric energy producing elements by means of conventional machines employed in paper-making industries, said method comprising:

continuously applying to a first surface of a continuous length of an ion-permeable member a thin cohesive coating of fine carbon particles, thereby forming said positive pole;

continuously applying to a second surface of said ion-permeable member a thin metal member as said negative pole; and bonding said thin metal member to said ion-permeable member by continuously applying therebetween a layer of semisolid adhesive as said electrolyte, thereby forming a continuous length composite sheet form battery having a thickness, flexibility and cutting characteristics similar to paper.

18. A method as claimed in claim 17, comprising applying said cohesive coating of fine carbon particles by means of a paper coating machine.

19. A method as claimed in claim 17, comprising employing a paper laminating machine for performing said applying said thin metal member to said ion-permeable member.

20. A method as claimed in claim 17, wherein said thin metal member comprises aluminum foil or zinc foil.

21. A method as claimed in claim 17, comprising applying a continuous thin cohesive coating of aluminum powder or zinc powder as said thin metal member.

22. A method as claimed in claim 21, comprising applying said thin cohesive coating by means of a paper coating machine.

23. A method as claimed in claim 17, further comprising cutting said composite sheet form battery into smaller pieces of desired size and shape, by means of a paper cutting mechanism, thereby forming a plurality of smaller batteries.

* * * * *